Oct. 14, 1958 H. GARIH 2,855,658
CUTTER WITH INSERTED BLADES
Filed Nov. 13, 1953 3 Sheets-Sheet 2
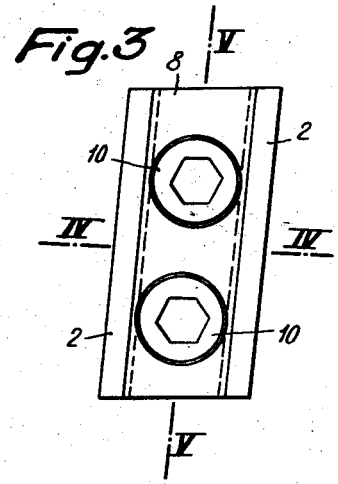
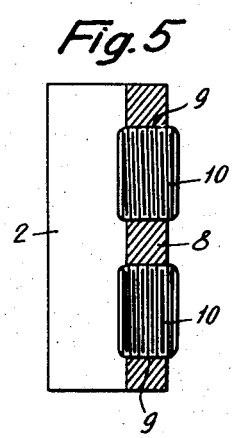
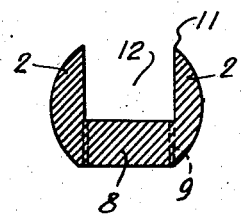
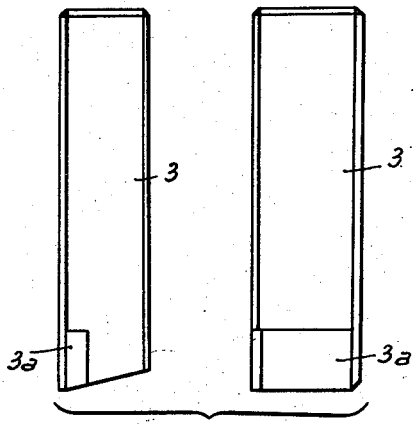
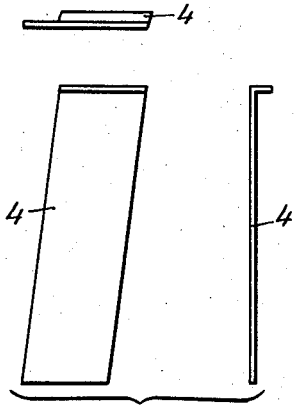
INVENTOR
HENRI GARIH
By: Young, Emery & Thompson
Attys.

United States Patent Office 2,855,658
Patented Oct. 14, 1958

2,855,658

CUTTER WITH INSERTED BLADES

Henri Garih, Paris, France

Application November 13, 1953, Serial No. 391,911

Claims priority, application France May 13, 1953

3 Claims. (Cl. 29—105)

My invention has for its object a cutter with inserted blades together with an improved manner of fastening the latter.

Numerous types of cutters with inserted blades are known which have the advantage of allowing an almost indefinite increase of the life of said tools, by reason of the possibility of easily replacing worn blades or, at least, of using blades including very hard metal inserts and finally it is possible to proceed to a frequent sharpening. However, cutters of this type are generally objectionable by reason of the manner of fitting or securing the blades since it is necessary for their insertion or removal to proceed with the hammering, in or out, of a suitably shaped pin or wedge or else, a strap and fastening bolt for instance are required.

As a matter of fact, the first manner of fitting the blade produces generally a clamping which is not uniform and leads to a rapid deformation and wear and it necessitates, furthermore, a comparatively lengthy and costly operation. As to the second manner of securing the blade, it is generally but little reliable and is particularly objectionable for many machining operations.

The present invention has for its object to remove these drawbacks by providing a manner of securing the blades which is rapid, efficient and cheap.

According to said invention, the cutter with its inserted blades is constituted on one hand by a cutter body provided at its periphery with a plurality of identical radial notches which are uniformly spaced and assume a cylindrical shape having an axis substantially parallel with that of the body or slightly sloping with reference thereto, said notches extending inwardly so as to form longitudinal cuts and opening outwardly into the periphery of the cutter body; furthermore, an equivalent number of cylindrical sleeves the cross-sections of which match the circular cross-sections of the notches, engaged by said sleeves, are provided each with an inner recess opening laterally of the sleeve so as to form with the longitudinal cut in the corresponding notch, a housing for the actual blade or tool which assumes the shape of a bar, preferably of rectangular cross-section; lastly, means are provided for locking said blade inside the corresponding sleeve.

In a preferred embodiment, the blade or tool is locked inside the blade-carrying sleeve by two screws engaging a flat surface formed on said sleeve and registering with the periphery of the cutter while the tool engaging the bottom of the cut forming an extension of the notch through the part of its cross-section extending outside the sleeve presses the latter inside the body of the cutter.

An embodiment of this type of cutter with inserted blades according to the invention, is illustrated by way of example in accompanying drawings, wherein:

Fig. 3 is an elevational front view of the blade-carrying sleeve;

Fig. 4 is a plan view of the sleeve;

Fig. 5 is a cross-sectional view of said sleeve;

Fig. 6 shows in plan view, side view and front view, a blade-securing wedge;

Fig. 7 is a front view and a side view of the blade;

As illustrated, the cutter with inserted blades according to the invention is constituted by a cutter body 1 (Figs. 1 and 2), a plurality of blade-carrying sleeves such as 2 (Figs. 3 and 4) and a plurality of wedges 4 (Fig. 6).

Figure 1:
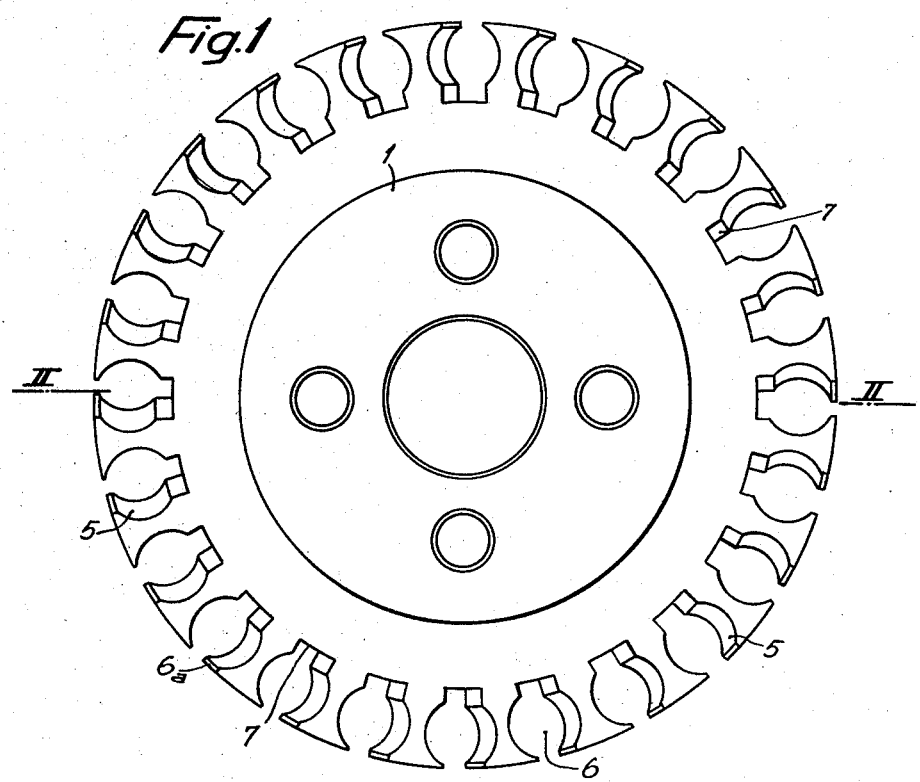
Fig. 1 is a plan view of the cutter body.
Figure 2:
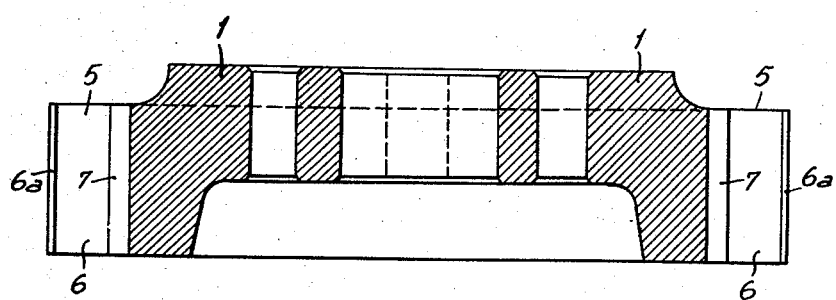
Fig. 2 is a cross-sectional view through line II—II of Fig. 1.
Figure 8:
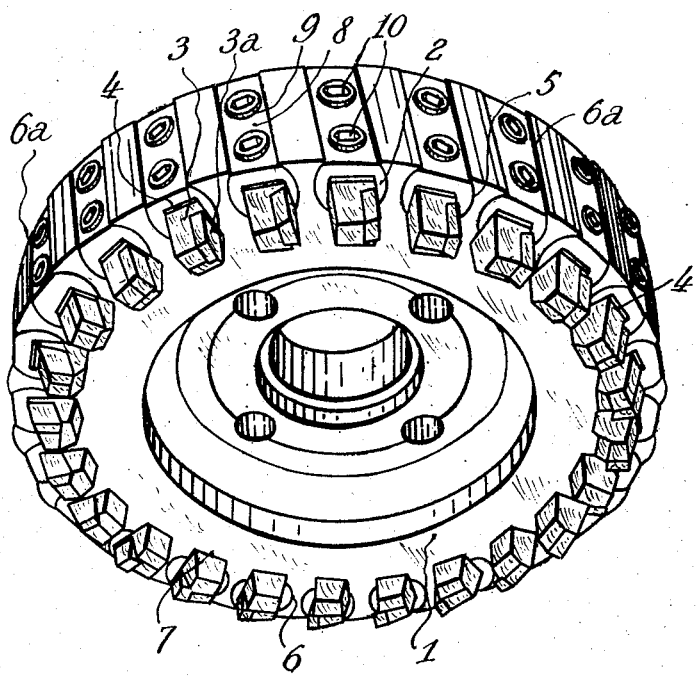
Fig. 8 is a perspective view of the assembled cutter of the invention.

The cutter body 1 shown in Figs. 1 and 2, is provided at its periphery with a plurality of equally distributed radial notches, such as 5, constituted each by a transverse cylindrical bore 6 opening laterally at 6a into the peripheral surface of the body and provided with a radial extension or cut 7 directed inwardly and the cross-section of which in a plane substantially perpendicular to the axis of the cutter body is rectangular.

In the example illustrated, the planes of symmetry of the notches 5 in the cutter body are slightly sloping with reference to the radial planes of the cutter body 1.

In each of the notches 5 is fitted a blade-carrying sleeve 2 the outer cylindrical surface of which includes a flat section 8 registering with the periphery of the cutter body in substantially tangent relationship with reference thereto. Through said flat surface section two tapped openings 9 extend and are adapted to receive corresponding set-screws 10.

Said sleeve 2, the cross-section of which matches that of the bore section 6 of the notch and which is to be fitted coaxially inside said bore, is provided with an inner recess 12 extending longitudinally of said sleeve and the transverse cross-section of which is rectangular, said recess opening, in diametrically opposed relationship with reference to the flat section, into a section of the periphery of the sleeve, defined by two generating lines 11, whereby the cross-section of said recess in the sleeve forms, in association with the cross-section of the cut or notch extension 7 in the body of the cutter, a rectangle extending perpendicularly to the axis of the cooperating blade or tool 3.

Said blade 3 is an ordinary steel bar including an additional element 3a of hard metal or better still, of a metal carbide, the outline of said blade suiting the conditions of operation.

The blade 3 is inserted inside the sleeve 2 and wedged therein by a wedge 4, shown separate in Fig. 6, and the arrangement obtained is fitted inside one of the notches 5 of the cutter body 1 whereby the wedge 4 when assembled urges the blade 3 laterally into position.

It is sufficient to screw down the set screws 10, so as to urge the tool 3 against the bottom of the cut 7 in the cutter body, whereby the sleeve 2 is submitted to reaction and is consequently urged towards the outer periphery of the cutter body to be held rigidly inside the latter; the deformation thus produced in the sleeve clamps the sides of the tool 3 which is thus held in a perfectly rigid manner. The projection of the cross-section of the tool inwardly, beyond the sleeve, prevents the latter from rotating.

It should be remarked that the cross-section of the blade or tool should be large so that its longitudinal projection beyond the sleeve which corresponds to an overhanging thereof, cannot produce any vibration which would be detrimental to the proper behaviour of the tool.

The improved cutter with inserted blades described hereinabove, shows in particular the following advantages:

It is possible to insert a very large number of blades in the cutter body, and in the example illustrated, corresponding to a cutter having a diameter of 300 mm., it is possible to insert twenty-four tools in the cutter body;

The removable tool may be secured in a very speedy and easy manner without any tool being required beyond a mere screw-driver, since it is sufficient to screw or unscrew the two small setscrews when it is desired to change a blade or to remove it for sharpening purposes.

Obviously, many detail modifications may be brought to the embodiment disclosed, without unduly widening thereby the scope of the invention, as defined in accompanying claims.

In particular, the axes of the notches provided in the body of the cutter, and consequently the axes of the blade-carrying sleeves, may be parallel with the axis of the cutter body, and a suitable cutting angle is given to the actual tool whereas, in the case illustrated, the axes of the sleeves are sloping with reference to the corresponding radial planes of the cutting body so as to produce the desired cutting angle for the tool.

What I claim is:

1. An inserted-blades milling cutter comprising a cylindrical body provided at its periphery with a plurality of radially directed equal notches opening into the periphery of said body, the cross section of each of which, in a plane substantially perpendicular to the axis of the cutter, forms a circular portion defined by two semicircular lines extending symmetrically to either side of a substantially radial line of the cutter body, and a radial rectangular extension towards the center of the cutter body, defined by two straight longitudinal lines extending in parallelism beyond the inner ends of said semicircular lines symmetrically with reference to the said substantially radial line and a transverse straight line closing the cross section between the inner ends of said straight parallel longitudinal lines, the circular portion of the cross section of the said notch being opened into the outer periphery of the cutter body through a gap extending between short lines connecting the outer ends of the semicircular lines with the said periphery and substantially as broad as the radial rectangular extension of the notch, an equal plurality of cylindrical sleeves adapted to be removably fitted each inside of said circular portions of the notches in the body, the cross section of each of said sleeves, in the same plane substantially perpendicular to the axis of the cutter, matching exactly the circular portion of the notch but being provided with a recess bounded by two straight lines extending in parallelism with and symmetrically to either side of a radius of the system of the two semicircular lines defining the cross section of the sleeve, and by a transverse line perpendicular to last-mentioned straight parallel lines and connecting their ends remote from the opening of the recess in the sleeve, the distance between the two straight lines bounding the recess in the sleeve being equal to that between the longitudinal lines defining the radial extension of the notch in the cutter body so that said recess opened into the inner section of the sleeve surface forms, when said sleeve is positioned into the circular portion of the notch, in registering with the radial extension of the latter a rectangular housing, a plurality of tools adapted to be substantially exactly fitted each inside any of the rectangular housings formed by the recess of the sleeve and the notch extension registering with each other, and means adapted to clamp the tool inside the above-mentioned housing in simultaneously securing the sleeve engaged by the tool inside the cooperating housing.

2. An inserted-blades milling cutter comprising a cylindrical body provided at its periphery with a plurality of radially directed equal notches opening into the periphery of said body, the cross section of each of which, in a plane substantially perpendicular to the axis of the cutter, forms a circular portion defined by two semicircular lines extending symmetrically to either side of a substantially radial line of the cutter body, and a radial rectangular extension towards the center of the cutter body, defined by two straight longitudinal lines extending in parallelism beyond the inner ends of said semicircular lines symmetrically with reference to the said substantially radial line and a transverse straight line closing the cross section between the inner ends of said straight parallel longitudinal lines, the circular portion of the cross section of the said notch being opened into the outer periphery of the cutter body through a gap extending between short lines connecting the outer ends of the semicircular lines with the said periphery and substantially as broad as the radial rectangular extension of the notch, an equal plurality of cylindrical sleeves adapted to be removably fitted each inside of said circular portions of the notches in the body, the cross section of each of said sleeves, in the same plane substantially perpendicular to the axis of the cutter, matching exactly the circular portion of the notch but being provided with a recess bounded by two straight lines extending in parallelism with and symmetrically to either side of a radius of the system of the two semicircular lines defining the cross section of the sleeve, and by a transverse line perpendicular to last-mentioned straight parallel lines and connecting their ends remote from the opening of the recess in the sleeve, the distance between the two straight lines bounding the recess in the sleeve being equal to that between the longitudinal lines defining the radial extension of the notch in the cutter body so that said recess opened into the inner section of the sleeve surface forms, when said sleeve is positioned into the circular portion of the notch, in registering with the radial extension of the latter a rectangular housing, a plurality of tools adapted to be substantially exactly fitted each inside any of the rectangular housings formed by the recess of the sleeve and the notch extension registering with each other, and means for holding each tool fast and urging it into position inside the cooperating housings, the last-mentioned means extending through the sleeve surface perpendicularly to the axis of the sleeve and thereby securing simultaneously the sleeve engaged inside the circular portion of the notch in the body.

3. An inserted-blades milling cutter comprising a cylindrical body provided at its periphery with a plurality of radially directed equal notches opening into the periphery of said body, the cross section of each of which, in a plane substantially perpendicular to the axis of the cutter, forms a circular portion defined by two semicircular lines extending symmetrically to either side of a substantially radial line of the cutter body, and a radial rectangular extension towards the center of the cutter body, defined by two straight longitudinal lines extending in parallelism beyond the inner ends of said semicircular lines symmetrically with reference to the said substantially radial line and a transverse straight line closing the cross section between the inner ends of said straight parallel longitudinal lines, the circular portion of the cross section of the said notch being opened into the outer periphery of the cutter body through a gap extending between short lines connecting the outer ends of the semicircular lines with the said periphery and substantially as broad as the radial rectangular extension of the notch, an equal plurality of cylindrical sleeves adapted to be removably fitted each inside of said circular portions of the notches in the body, the cross section of each of said sleeves, in the same plane substantially perpendicular to the axis of the cutter, matching exactly the circular portion of the notch but being provided with a recess bounded by two straight lines extending in parallelism with and symmetrically to either side of a radius of the system of the two semicircular lines defining the cross section of the sleeve, and by a transverse line perpendicular to last-mentioned straight parallel lines and connecting their ends remote from the opening of the recess in the sleeve, the distance between the two straight lines bounding the recess in the sleeve being equal to that between the longitudinal lines defining the radial extension of the notch in the cutter body so that said recess opened into the inner section of the sleeve surface forms, when said sleeve is positioned into the circular portion of the notch, in registering with the radial extension of the latter a rectangular housing, a plurality of tools adapted to be substantially exactly fitted each inside any of the rectangular housings formed by the recess of the sleeve and the notch extension registering with each other, the outer surface of each cylindrical sleeve including a flat section extending in parallelism with its axis and symmetrically with reference to the plane of symmetry of the recess of the sleeve, said flat section being diametrically opposed to the opening of said recess and adapted to face the outer periphery of the body when the sleeve is in its operative position, each sleeve being provided with tapped holes extending through said flat section and into the recess in the sleeve, and set screws engaging said tapped holes and adapted to urge the tool inside said housing into clamping engagement with the cutter body and thereby the sleeve into clamping engagement with said cutter body.

References Cited in the file of this patent

UNITED STATES PATENTS

| | | |
|---|---|---|
| 887,079 | Eynon | May 12, 1908 |
| 1,099,880 | Kendall | June 9, 1914 |
| 1,137,216 | Klingborg | Apr. 27, 1915 |
| 2,239,794 | Morse | Apr. 29, 1941 |
| 2,325,746 | Curtis | Aug. 3, 1943 |
| 2,382,509 | Seiter | Aug. 14, 1945 |
| 2,690,611 | Skeel | Oct. 5, 1954 |

FOREIGN PATENTS

| | | |
|---|---|---|
| 478,286 | Germany | June 22, 1929 |
| 622,871 | Great Britain | May 9, 1949 |